United States Patent [19]

Miller et al.

[11] 4,436,879
[45] Mar. 13, 1984

[54] COPOLYESTER-CARBONATE BLENDS

[75] Inventors: Kenneth F. Miller, Mt. Vernon; Edward Belfoure, New Harmony, both of Ind.

[73] Assignee: General Electric Company, Mt. Vernon, Ind.

[21] Appl. No.: 452,908

[22] Filed: Dec. 27, 1982

[51] Int. Cl.$^3$ .............................................. C08L 69/00
[52] U.S. Cl. .................................... 525/439; 525/466; 528/176
[58] Field of Search ................ 525/439, 466; 528/176, 528/191

[56] References Cited

U.S. PATENT DOCUMENTS 4,286,083  8/1981  Kochanowski .................... 525/439

FOREIGN PATENT DOCUMENTS 55-131048  10/1980  Japan .................................. 525/439

Primary Examiner—Theodore E. Pertilla
Attorney, Agent, or Firm—Martin B. Barancik

[57] ABSTRACT

Thermoplastic compositions comprised of, in physical admixture, from:
(i) about 1 to about 85 weight percent of at least one randomly branched aromatic polycarbonate resin; and
(ii) about 15 to about 99 weight percent of at least one aromatic copolyester-carbonate resin.

27 Claims, No Drawings

COPOLYESTER-CARBONATE BLENDS

BACKGROUND OF THE INVENTION

Copolyester-carbonates are known thermoplastic materials which, due to their many advantageous properties, find use as thermoplastic engineering materials. The copolyester-carbonates exhibit, for example, excellent properties of toughness, flexibility, impact resistance and high heat distortion temperatures. However, the copolyester-carbonates, due to their relatively high melt viscosities, are generally relatively difficult to process. Furthermore, there are certain applications where copolyester-carbonate resins exhibiting a greater degree of hydrolytic stability than that normally possessed by copolyester-carbonate resins are needed.

These problems of providing improved processability and greater hydrolytic stability have been met by the prior art by incorporating into the copolyester-carbonate compositions various additives. These additives have consisted of compounds which improve the processability of the copolyester-carbonate compositions and compounds which improve the hydrolytic stability of these compositions. The addition of these additives while generally being effective in improving the processability of the compositions and the hydrolytic stability of the copolyester-carbonate compositions sometimes adversely affects some of the other advantageous properties thereof, such as the heat distortion temperature and the optical properties such as transparency. It would thus be very advantageous if copolyester-carbonates could be provided which retained substantially most of their other advantageous properties and simultaneously exhibited improved processability, or improved hydrolytic stability.

It is, therefore, an object of the instant invention to provide copolyester-carbonate compositions exhibiting improved processability while simultaneously retaining, to a substantial degree, most of the other advantageous properties of copolyester-carbonates, particularly their heat distortion temperatures and optical transparency; and provide copolyester-carbonate compositions exhibiting improved hydrolytic stability.

SUMMARY OF THE INVENTION

In accordance with the instant invention there are provided blends of copolyester-carbonate resins and branched aromatic polycarbonate resins comprising from about 15 to about 99 weight percent of said copolyester-carbonates and from about 1 to about 85 weight percent of said polycarbonates. Blends containing from about 1 to about 15 weight percent branched polycarbonate resin exhibit improved processability while retaining, to a substantial degree, the high heat distortion temperatures of unmodified copolyester-carbonates. Blends containing from about 15 to about 85 weight percent branched polycarbonate resin exhibit improved hydrolytic stability; while blends containing from about 20 to about 50 weight percent branched polycarbonate exhibit improved hydrolytic stability and improved thick section impact strength.

DESCRIPTION OF THE INVENTION

The instant invention is directed to copolyester-carbonate blends. More specifically, the instant invention is directed to blends of copolyester-carbonate resins and branched aromatic polycarbonate resins comprised of from about 1 to about 85 weight percent of at least one high molecular weight aromatic randomly branched polycarbonate resin and from about 15 to about 99 weight percent of at least one copolyester-carbonate resin.

The copolyester-carbonates of the instant invention are known compounds which are disclosed, inter alia, in U.S. Pat. Nos. 3,169,121; 3,030,331; 4,156,069; 4,238,596 and 4,238,597, all of which are incorporated herein by reference.

Briefly stated, the high molecular weight aromatic copolyester-carbonates of this invention comprise recurring carbonate groups, carboxylate groups, and aromatic carbocyclic groups in the linear polymer chain, in which at least some of the carboxylate groups and at least some of the carbonate groups are bonded directly to ring carbon atoms of the aromatic carbocyclic groups.

These copolyester-carbonate polymers contain ester and carbonate bonds in the polymer chain, wherein the amount of the ester bonds is from about 25 to about 90 mole percent, preferably from about 35 to about 80 mole percent, relative to the carbonate bonds. For example, 5 moles of bisphenol-A reacting completely with 4 moles of isophthaloyl dichloride and 1 mole of phosgene would give a copolyester-carbonate of 80 mole percent ester bonds.

The copolyester-carbonates are in general prepared by coreacting (i) a difunctional carboxylic acid or a reactive derivative thereof, (ii) a dihydric phenol, and (iii) a carbonate precursor.

The dihydric phenols useful in the preparation of the copolyester-carbonates are represented by the general formula

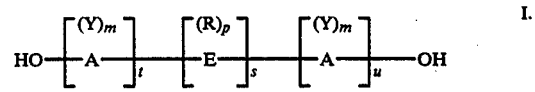

in which A is an aromatic group such as phenylene, biphenylene, naphthylene, anthrylene, etc. E may be an alkylene or alkylidene group such as methylene, ethylene, propylene, propylidene, isopropylidene, butylene, butylidene, isobutylidene, amylene, isoamylene, amylidene, isoamylidene, etc. Where E is an alkylene or alkylidene group, it may also consist of two or more alkylene or alkylidene groups connected by a non-alkylene or non-alkylidene group such as an aromatic linkage, a tertiary amino linkage, an ether linkage, a carbonyl linkage, a silicon-containing linkage, or by a sulfur containing linkage such as sulfide, suloxide, sulfone, etc. In addition E may be a cycloaliphatic group such as cyclopentyl, cyclohexyl, cyclohexylidene, and the like; a sulfur containing linkage such as sulfide, sulfoxide, or sulfone; an ether linkage; a carbonyl group; a tertiary nitrogen group; or a silicon-containing linkage such as silane or siloxy. R is selected from hydrogen or a monovalent hydrocarbon group such as alkyl (methyl, ethyl, propyl, etc.), aryl (phenyl, naphthyl, etc.), aralkyl (benzyl, ethylphenyl, etc.), alkaryl, or cycloaliphatic (cyclopentyl, cyclohexyl, etc.) Y may be an inorganic atom such as chlorine, bromine, fluorine, etc.; an inorganic group such as the nitro group; an organic group such as R above; or an oxy group such as OR, it being only necessary that Y be inert to and unaffected by the reactants and the reaction conditions. The letter m is any whole number from and including zero through the number of positions on A available for substitution; p is any whole number from and including zero through the number of positions on E available for substitution; t is a whole number equal to at least one; s is either zero or one; and u is any whole number including zero.

In the dihydric phenol compound represented by Formula I above, when more than one Y substituent is present, they may be the same or different. The same is true for the R susbtituent. Where s is zero in Formula I and u is not zero, the aromatic rings are directly joined with no intervening alkylene or other bridge. The positions of the hydroxyl groups and Y on the aromatic nuclear residues can be varied in the ortho, meta, or para positions and the groupings can be in a vicinal, asymmetrical or symmetrical relationship, where two or more ring carbon atoms of the aromatic hydrocarbon residue are substituted with Y and hydroxyl group.

Examples of dihydric phenol compounds that may be employed in this invention, and which are represented by Formula I, include, but are not limited to:
2,2-bis(4-hydroxyphenyl)propane (bisphenol-A);
2,4'-dihydroxydiphenylmethane;
bis(2-hydroxyphenyl)methane;
bis(4-hydroxyphenyl)methane;
bis(4-hydroxy-5-nitrophenyl)methane;
bis(4-hydroxy-2,6-dimethyl-3-methoxyphenyl)methane;
1,1-bis(4-hydroxyphenyl)ethane;
1,2-bis(4-hydroxyphenyl)ethane;
1,1-bis(4-hydroxy-2-chlorophenyl)ethane;
1,1-bis(2,5-dimethyl-4-hydroxyphenyl)ethane;
1,3-bis(3-methyl-4-hydroxyphenyl)propane;
2,2-bis(3-phenyl-4-hydroxyphenyl)propane;
2,2-bis(3-isopropyl-4-hydroxyphenyl)propane;
bis(4-hydroxyphenyl)phenylmethane;
bis(4-hydroxyphenyl)cyclohexane; and the like.

Other useful dihydric phenols are disclosed in U.S. Pat. Nos. 3,169,121; 2,288,282; 3,148,172 and 2,739,171, all of which are incorporated herein by reference.

Preferred dihydric phenols are those wherein E is an alkylene, alkylidene, cycloalkylene, or cycloalkylidene group, A is a phenyl group, s is one, u is one, and t is one.

In general, any difunctional carboxylic acid conventionally used in the preparation of linear polyesters may be utilized in the preparation of the copolyester-carbonates of the present invention. In general, the carboxylic acids which may be used include the aliphatic carboxylic acids, the aliphatic-aromatic carboxylic acids, and the aromatic carboxylic acids. These acids are disclosed in U.S. Pat. No. 3,169,121.

The difunctional carboxylic acids which may be utilized in the preparation of the copolyester-carbonates generally conform to the formula

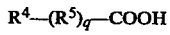

$$R^4-(R^5)_q-COOH \qquad \text{II.}$$

wherein $R^5$ is an alkylene, alkylidene, aralkylene, aralkylidene or cycloaliphatic group; an alkylene, alkylidene or cycloaliphatic group containing ethylenic unsaturation; an aromatic group such as phenylene, biphenylene, and the like; two or more aromatic groups connected through non-aromatic linkages such as alkylene or alkylidene groups; and the like. $R^4$ is either a carboxyl or a hydroxyl group. The letter q represents one where $R^4$ is a hydroxyl group and either zero or one where $R^4$ is a carboxyl group.

Preferred difunctional carboxylic acids are the aromatic carboxylic acids, i.e., those acids of Formula II wherein q is one, $R^4$ is a carboxyl or hydroxyl group, and $R^5$ is an aromatic group such as phenylene, naphthylene, biphenylene, and the like. The preferred aromatic carboxylic acids are those represented by the general formula

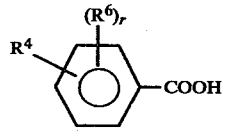

wherein:
$R^4$ is as defined above;
$R^6$ is independently selected from inorganic atoms such as halogens, inorganic groups such as the nitro, amine, and the like, a monovalent organic group such as alkyl, aryl, alkaryl, aralkyl, cycloaliphatic, and a hydrocarbonoxy group such as alkoxy or aryloxy; and
r represents a whole number having a value of from 0 to 4 inclusive.

When more than one $R^6$ substituent is present, they may be the same or different.

Mixtures of these difunctional carboxylic acids can also be employed, and where the term difunctional carboxylic acid is used herein mixtures of two or more different difunctional carboxylic acids as well as individual difunctional carboxylic acids are considered to be included therein.

Preferred aromatic difunctional carboxylic acids are isophthalic acid, terephthalic acid, and mixtures thereof. A particularly useful mixture of isophthalic acid and terephthalic acid is one wherein the weight ratio of isophthalic acid and terephthalic acid is in the range of from about 1:10 to about 10:1.

Rather than utilizing the difunctional carboxylic acids per se it is possible, and sometimes even preferred, to employ their reactive derivatives. The preferred reactive derivatives of the difunctional carboxylic acids are the acid halides. Preferred acid halides are the acid dichlorides. Thus, for example, instead of using isophthalic acid or terephthalic acid it is possible to use isophthaloyl dichloride or terephthaloyl dichloride.

The carbonate precursor employed in the preparation of the copolyester-carbonates can be a carbonyl halide, a diaryl carbonate, or a bishaloformate. The preferred carbonate precursors are the carbonyl halides. The carbonyl halides include carbonyl chloride, carbonyl bromide, and mixtures thereof. The preferred carbonyl halide is carbonyl chloride, also known as phosgene.

The copolyester-carbonates may be prepared by any of the usual well known procedures. One of these procedures is the interfacial polymerization process.

The polycarbonate that is admixed with the aforedescribed copolyester-carbonate to form the blends of the instant invention is a high molecular weight thermoplastic randomly branched aromatic polycarbonate. This type of polycarbonate is well known in the art and is derived from the coreaction of (i) a carbonate precursor; (ii) a dihydric phenol; and (iii) a small amount of a polyfunctional organic compound.

The dihydric phenols useful in preparing the polycarbonates of the instant invention can be represented by the general formula

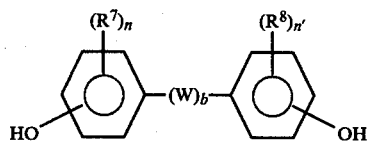

IV.

wherein:

W is selected from divalent hydrocarbon radicals,

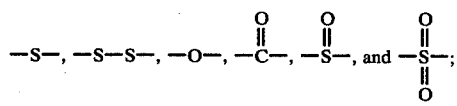

each $R^7$ is independently selected from halogen radicals, monovalent hydrocarbon radicals, and monovalent hydrocarbonoxy radicals;
each $R^8$ is independently selected from halogen radicals, monovalent hydrocarbon radicals, and monovalent hydrocarbonoxy radicals;
b is either one or zero; and
n and n' are independently selected from whole numbers having a value of from 0 to 4 inclusive.

The divalent hydrocarbon radicals represented by W include alkylene radicals, preferably those containing from 2 to about 6 carbon atoms; alkylidene radicals, preferably those containing from 1 to about 6 carbon atoms, cycloalkylene radicals, preferably those containing from 4 to about 12 carbon atoms; and cycloalkylidene radicals, preferably those containing from 4 to about 12 carbon atoms.

Preferred halogen radicals represented by $R^7$ and $R^8$ are chlorine and bromine. The monovalent hydrocarbon radicals represented by $R^7$ and $R^8$ include alkyl radicals; preferably those containing from 1 to about 6 carbon atoms; aryl radicals, preferably those containing 6-12 carbon atoms; aralkyl radicals, preferably those containing from 7 to about 14 carbon atoms; and alkaryl radicals, preferably those containing from 7 to about 14 carbon atoms. The monovalent hydrocarbonoxy radicals represented by $R^7$ and $R^8$ include the alkoxy and the aryloxy radicals.

When more than one $R^7$ substituent is present they may be the same or different. The same is true for the $R^8$ substituent. The positions of the hydroxyl groups and $R^7$ and $R^8$ on the aromatic nuclear residues can be varied in the ortho, meta, or para positions and the groupings can be in a vicinal, asymmetrical or symmetrical relationship, where two or more ring carbon atoms of the aromatic hydrocarbon residues are substituted with $R^7$ and/or $R^8$ and hydroxyl groups.

Some illustrative non-limiting examples of the dihydric phenols represented by Formula V include:
2,2-bis-(4-hydroxyphenyl)propane (bisphenol A);
1,1-bis-(4-hydroxyphenyl)ethane;
1,1-bis-(3,5-dimethyl-4-hydroxyphenyl)cyclohexane;
1,3-bis-(3-methyl-4-hydroxyphenyl)propane;
2,2-bis(3,5-methyl-4-hydroxyphenyl)propane;
bis-(4-hydroxy-2,6-dimethyl-3-methoxyphenyl)methane;
bis-(2-hydroxyphenyl)methane; and the like.

These dihydric phenol are well known in the art and are disclosed, inter alia, in U.S. Pat. Nos. 3,169,121; 2,288,282; 3,148,172 and 2,739,171, all of which are hereby incorporated herein by reference.

It is, of course, possible to utilize a mixture of two or more of these dihydric phenols rather tha one individual phenol in the preparation of the polycarbonates of the instant invention. Thus, when the term dihydric phenol is used herein it is meant to include mixtures of two or more dihydric phenols as well as single dihydric phenols.

The preferred dihydric phenols, from the standpoint of the instant invention, are those wherein b is one. The more preferred are those wherein W is an alkylidene or alkylene radicals and the hydroxy groups are in the 4, 4' positions.

The carbonate precursor employed in the production of the branched polycarbonates useful in the instant blends can be a carbonyl halide, a diaryl carbonate, or a bishaloformate. The preferred carbonate precursors are the carbonyl halides. The carbonyl halides include carbonyl chloride and carbonyl bromide, and mixtures thereof. The preferred carbonyl halide is carbonyl chloride, also known as phosgene.

The polyfunctional organic compounds used in making the instant branched polycarbonates are well known in the art and are disclosed, for example, in U.S. Pat. Nos. 3,525,712; 3,541,049; 3,544,514; 3,635,895; 3,816,373; 4,001,184; 4,294,953 and 4,204,047, all of which are hereby incorporated herein by reference. These polyfunctional organic compounds are generally aromatic in nature and contain at least three functional groups which may be, for example, hydroxyl, carboxyl, carboxylic anhydride, halformyl, and the like. Some illustrative non-limiting examples of these polyfunctional compounds include trimellitic anhydride, trimellitic acid, trimellityl trichloride, 4-chloroformyl phthalic anhydride, pyromellitic dianhydride, mellitic acid, mellitic anhydride, trimesic acid, benzophenonetetracarboxylic acid, benzophenonetetracarboxylic anhydride, 4,6-dimethyl-2,4,6-tri-(4-hydroxyphenyl)heptene-2, 4,6-dimethyl-2,4,6-tri-(4-hydroxyphenyl) heptane, and the like. The amount of this polyfunctional organic compound or branching agent used is in the range of from about 0.05 to about 2 mole %, based on the amount of dihydric phenol employed, preferably from about 0.1 to about 1 mole %.

In general, the instant branched polycarbonates are prepared by reacting the carbonate precursor, the dihydric phenol, and the branching agent. The carbonate precursor, dihydric phenol and branching agent are preferably mixed in an aqueous medium which contains a solvent for the resultant polycarbonate, a catalytic amount of a polymerization catalyst and a molecular weight regulator.

In its broadest scope the instant invention is directed to blends of copolyester-carbonate resins and branched polycarbonate resins which contain from about 1 to about 85 weight percent of at least one branched polycarbonate resin and from about 15 to about 99 weight percent of at least one copolyester-carbonate resin, based on the amount of copolyester-carbonate resin and branched aromatic polycarbonate resin present in the blends. At the lower ranges of the branched polycarbonate resin, these blends exhibit improved processability while maintaining, to a substantial degree, the relatively high heat distortion temperatures of unmodified copolyester-carbonates. At intermediate and higher amounts of branched polycarbonate resin, these blends exhibit improved hydrolytic stability as compared to unmodified copolyester-carbonate resins. At certain intermediate ranges of branched polycarbonate, these blends exhibit improved hydrolytic stability and improved thick section impact strength.

Thus, in one embodiment of the instant invention there are provided blends of copolyester-carbonate resin and randomly branched thermoplastic polycarbonate resin exhibiting improved processability while simultaneously exhibiting, to a substantial degree, generally similar heat distortion temperatures as those of unmodified copolyester-carbonates. In this embodiment of the invention the amount of the branched aromatic polycarbonate resin present in the blends is critical. If the blends contain too little of the branched polycarbonate there is no appreciable improvement in the processability of the blends. If too much of the randomly branched polycarbonate is present in the blend, there is an improvemnet in the processability of the blend but only at the expense of the heat distortion temperature of the blend. That is to say, if too much of the branched polycarbonate is present in the blend the processability is improved, i.e., the melt flow rate increases and the melt viscosity decreases, but the heat distortion temperature decreases.

Thus, the blends of this embodiment contain an amount of randomly branched polycarbonate effective to improve the processability of the blends but insufficient to significantly deleteriously affect the heat distortion temperature thereof. Generally this amount is in the range of from about 1 to about 15 weight %, preferably from about 2 to about 10 weight %, based on the amount of copolyester-carbonate resin and branched polycarbonate resin present in the blends.

In general, if the amount of the branched polycarbonate resin contained in the blends is less than about 1 weight %, there is no appreciable improvement in the processability of the blends. If, on the other hand, the blends contain more than about 15 weight % of said branched polycarbonate resin, the heat distortion temperatures of the blends begin to decrease.

It is also critical in this embodiment that the blends contain a branched aromatic polycarbonate. If the blends contain instead the same critical amounts of a non-halogenated linear polycarbonate resin, there will be an improvement in the processability of the blends but only at the expense of the heat distortion temperatures.

In another embodiment of the instant invention there are provided blends of copolyester-carbonate resin and branched aromatic polycarbonate resin exhibiting improved hydrolytic stability as compared with unmodified copolyester-carbonate resins. In certain ranges of copolyester-carbonate resin to branched aromatic polycarbonate resin these blends exhibit a greater hydrolytic stability than that exhibited by either the copolyester-carbonate resins or the branched aromatic polycarbonate resins alone.

Thus, the blends of this embodiment contain an amount of at least one branched aromatic polycarbonate resin effective to improve the hydrolytic stability of these blends. That is to say, these blends contain a hydrolytic stability improving amount of at least one branched aromatic polycarbonate resin. Generally, this amount is in the range of from about 15 to about 85 weight percent of the branched aromatic polycarbonate resin, based on the total amount of copolyester-carbonate resin and branched aromatic polycarbonate resin present in the blends. Preferably, these blends contain from about 20 to about 85 weight percent of at least one branched aromatic polycarbonate resin. Blends containing from about 20 to about 85 weight percent of the branched polycarbonate resin exhibit hydrolytic stability which is greater than that exhibited by either the copolyester-carbonate resin alone or the branched aromatic polycarbonates alone.

A third embodiment of the instant invention are blends of copolyester-carbonate resins and branched aromatic polycarbonate resins exhibiting improved processability and improved thick section impart strength, as compared with unmodified copolyester-carbonate resins. In certain ranges of the thermoplastic randomly branched aromatic polycarbonate the blends of the instant invention exhibit a greater hydrolytic stability and a greater thick section impact strength than that exhibited by either the copolyester-carbonate resin alone or the thermoplastic randomly branched aromatic polycarbonate resin alone.

Thus, in this embodiment the blends contain an amount of the branched polycarbonate resin effective to improve the hydrolytic stability of said blends and to improve the thick section impact strength of the blends. Generally, this amount is in the range of from about 20 to about 50 weight percent, based on the amount of the polycarbonate resin and copolyester-carbonate resin present. Generally, if more than about 50 weight percent or less than about 20 weight percent of the branched polycarbonate is present, the improvement in the thick section impact strength exhibited by the blends at the aforedescribed concentrations of polycarbonate resins begins to significantly decrease.

The method of blending the copolyester-carbonate resin with the branched polycarbonate resin is not critical and does not constitute part of this invention. One method of preparing the instant blends, for example, comprises blending the two preformed resins in powder or granular form, extruding the blend, chopping into pellets, and re-extruding.

The blends of the instant invention may optionally have admixed therewith the commonly known and used additives such as antioxidants; antistatic agents; glass fibers; impact modifiers; fillers such as mica, talc, clay and the like; colorants; ultraviolet radiation absorbers such as, for example, the benzophenones, benzotriazoles, cyanoacrylates, and the like; color stabilizers such as the organophosphites disclosed in U.S. Pat. Nos. 3,305,520 and 4,118,370, both of which are incorporated herein by reference; hydrolytic stabilizers such as the epoxides disclosed in U.S. Pat. Nos. 3,489,716; 4,138,379 and 3,829,247, all of which are incorporated herein by reference; flame retardants; and the like.

Some particularly useful flame retardants are the alkali and alkaline earth metal salts of sulfonic acids. These types of flame retardants are disclosed in U.S. Pat. Nos. 3,933,734; 3,931,100; 3,978,024; 3,948,851; 3,926,908; 3,919,167; 3,909,490; 3,953,396; 3,953,399; 3,917,559; 3,951,910 and 3,940,366, all of which are hereby incorporated herein by reference.

DESCRIPTION OF THE PREFERRED EMBODIMENT

The following examples are set forth to further illustrate the present invention and are not to be considered as limiting the invention thereto. Unless otherwise specified, where parts or percents are mentioned, they are parts or percents by weight.

PREPARATION A—COPOLYESTER-CARBONATE RESIN

To a reactor fitted with a mechanical agitator are charged 10 liters of deionized water, 16 liters of methylene chloride, 1,910 grams (8.36 moles) of bis-phenol-A, 24 milliliters of triethylamine, 3.4 grams of sodium gluconate and 65 grams (0.43 mole) of para-tertiarybutyl phenol. This reaction mixture is stirred and to the stirred reaction mixture are added over a 15 minute period a mixture of 926 grams of terephthaloyl dichloride and 163 grams of isophthaloyl dichloride as a 25 weight % solids solution in methylene chloride. During the acid chloride addition the pH is maintained in the range of 8.5–11.5 by the addition of 25% aqueous sodium hydroxide. The resulting mixture is phosgenated by the introduction of phosgene at the rate of 36 grams per minute for 15 minutes with the pH controlled at 9.5 to 12 by the addition of aqueous sodium hydroxide solution. After phosgenation is terminated 6 liters of methylene chloride are added, the brine layer is separated by centrifuge, and the resin solution is washed with aqueous acid and thrice with water. The resin is steam precipitated and dried in a nitrogen fluid bed drier at approximately 240° F. This resin product is then fed to an extruder operating at a temperature of about 600° F. to extrude the resin into strands and the strands are chopped into pellets. The pellets are then injection molded at about 620°–650° F. into test samples measuring about $2\frac{1}{2}"\times\frac{1}{2}"\times\frac{1}{8}"$. The Heat Distortion Temperature Under Load (DTUL) of these samples is determined according to modified ASTM D-648 test method.

Also determined for the copolyester-carbonate resin is the Kasha Index (KI) which is an indication or measure of the processability of the resin, i.e., the lower the KI the greater the melt flow rate and, therefore, the better the processability. Basically, the Kasha Index is a measurement of the melt viscosity of the resin. The procedure for determining the Kasha Index is as follows: 7 grams of resin pellets, dried a minimum of 90 minutes at 125° C., are added to a modified Tinius-Olsen model T3 melt indexer; the temperature in the indexer is maintained at 300° C. and the resin is heated at this temperature for 6 minutes; after 6 minutes the resin is forced through a 0.04125 inch radius orifice using a plunger of radius of 0.1865 inches and an applied force of 17.7 pounds; the time required for for the plunger to travel 2 inches is measured in centiseconds and this is reported as the KI. The higher the KI, the higher the melt viscosity and the more viscous the resin, and the more difficult to process.

The results of these tests are set forth in Table I.

PREPARATION B—BRANCHED POLYCARBONATE RESIN

To a reaction vessel are added 40 liters of water, 40 liters of methylene chloride, 15.9 kilograms of bisphenol-A, 227 grams of phenol, 80 grams of triethylamine, and 14 grams of sodium gluconate. With stirring the pH is raised to 9 by the addition of aqueous sodium hydroxide solution. To this reaction mixture are added 8 kilograms of phosgene and the pH is maintained at about 9–10. After about 40% of the phosgene has been introduced, 79 grams of trimellitic trichloride are added. At the end of the reaction the brine layer is separated from the resin layer, the resin layer is washed with water, aqueous HCl, and 3 more times with water.

The resin is then steam precipitated. The I.V. (intrinsic viscosity) of the resin as measured in methylene chloride at 25° C. is found to be about 0.64 dl/gm.

EXAMPLES 2–6

Various blends of the copolyester-carbonate of Preparation A and the branched polycarbonate of Preparation B were prepared by admixing these two resins in various amounts. These blends were then formed into test samples as described for Preparation A. The blends and the test samples formed from these blends were then subjected to tests to determine the KI and the DTUL. The KI, DTUL, and the amounts of the branched polycarbonate of preparation B present in these blends are set forth in Table I.

These Examples illustrate the embodiment of the instant invention directed to blends exhibiting improved processability while retaining substantially similar heat distortion temperatures as unmodified and unblended copolyester-carbonates resins alone.

TABLE I

| Example No. | wt. % of polycarbonate of preparation B | DTUL °C. (264 psi) | KI |
|---|---|---|---|
| Control prep. A* | 0 | 161.1 | 42,630 |
| 2* | 2 | 162.1 | 42,540 |
| 3* | 5 | 161.3 | 39,515 |
| 4* | 10 | 161.8 | 34,585 |
| 5** | 20 | 153.8 | 29,730 |
| 6** | 40 | 150.3 | 23,580 |
| prep. B** | 100 | 136.4 | 16.170 |

*The blends of Examples 2–4 and the control all contained 0.03 phr of an organophosphite, 0.1 phr of an epoxide, and 50 ppm of an aromatic sulfonic acid salt flame retardant.
**The blends of Examples 5, 6 and prep. B all contained 0.03 phr of an organophosphite, 0.1 phr of an epoxide, and 0.2 phr of a silicone oil.

As illustrated by the data in Table I the heat distortion temperatures of Examples 2–4, which contain from 2 to 10 weight percent of the branched polycarbonate resin and fall within the scope of the first embodiment of the instant invention, are substantially equivalent to the heat distortion temperature of the copolyester-carbonate resin alone (Control). However, there is a significant decrease in the KI of the blends of Examples 2–4 relative to the KI of the Control. Thus, blends of Examples 2–4 exhibit an improvement in processability while at the same time retaining, to a substantial degree, the high heat distortion temperatures of unblended copolyester-carbonates.

However, in Examples 5–6, which fall outside the scope of the first embodiment by virtue of the fact that the amount of the branched polycarbonate resin present in the blends exceeds the limit of 15 weight percent, the processability is improved but only at the expense of the heat distortion temperatures.

This data clearly shows that an improvement in processability, while at the same time retaining substantially equivalent heat distortion temperatures to those of copolyester-carbonate resins alone, of blends comprised of copolyester-carbonate resins and branched aromatic polycarbonate resins is achieved only over certain narrow and critical ranges of copolyester-carbonate resin and branched polycarbonate resin.

EXAMPLES 7–10

Various blends of the copolyester-carbonate resin of Preparation A and the branched polycarbonate resin of Preparation B were prepared. These blends were formed into test chips measuring about 2"×3"×⅛" substantially in accordance with the procedure described in Preparation A; and into test panels measuring about 2½"×½"×¼", also substantially in accordance with the procedure described in Preparation A. The test chips were subjected to ASTM test method D-1003 for determining light transmission of the chips before steam autoclaving and after steam autoclaving at 250° F. for 24.5 hours, 47.5 hours, 71 hours, 93 hours, 121 hours, and 145 hours respectively. The results of this test, as well as the amount of branched polycarbonate present in the blends, are set forth in Table II. The test panels were subjected to the Notched Izod (NI) test, ASTM test method D-256, to determine the ¼ inch impact strength. The results of this test are also set forth in Table II.

These Examples illustrate the embodiment of the instant invention directed to blends exhibiting improved hydrolytic stability; and to the third embodiment of the instant invention directed to blends exhibiting both improved hydrolytic stability and improved thick section impact strength.

TABLE II

| Example No. | wt. % of polycarbonate of prep. B | % Transmission | | | | | | | NI |
|---|---|---|---|---|---|---|---|---|---|
| | | 0 hrs. | 24.5 hrs. | 47.5 hrs. | 71 hrs. | 93 hrs. | 121 hrs. | 145 hrs. | |
| Control Prep. A* | 0 | 87.4 | 86.7 | 84.3 | 74.9 | 24.8 | >5 | >5 | 6.0 |
| 7 | 20 | 88.6 | 87.9 | 87.1 | 84.2 | 77.6 | 39.9 | >5 | 6.4 |
| 8 | 40 | 89.3 | 88.6 | 88.2 | 87.2 | 87.5 | 86.9 | 85.5 | 8.7 |
| 9 | 60 | 89.7 | 88.8 | 87.8 | 87.9 | 87.3 | 85.9 | 78.2 | 5.7 |
| 10 | 80 | 89.9 | 88.4 | 87.5 | 86.9 | 86.3 | 85.2 | 83.8 | 2.6 |
| Prep. B | 100 | 89.2 | 84.9 | 79.5 | 77.9 | 67.8 | 52.9 | 26.1 | 2.1 |

*All of the Examples in Table II, including Prep. A and Prep. B, contain 0.03 phr of an organophosphite, 0.1 phr of an epoxide, and 0.2 phr of a silicone oil.

The data in Table II clearly illustrates that the hydrolytic stability of the instant blends, as measured by the percent of light transmission, is greater than the hydrolytic stability of the copolyester-carbonate resin alone. As a matter of fact, the blends of Examples 8–10 exhibit a hydrolytic stability greater than the hydrolytic stability of either the branched polycarbonate resin alone or the copolyester-carbonate resin alone.

Generally, the higher the percent of light transmitted through a sample the better the clarity of the sample, and thus the better the degree of hydrolytic stabilization of the sample. Conversely, the lower the amount of light transmitted through a sample, the worse the clarity of the sample, and thus the lesser the degree of hydrolytic stabilization of the sample.

The data in Table II further illustrates that Examples 7 and 8 exhibit a greater thick section impact strength than that processed by either the branched polycarbonate resin alone or the copolyester-carbonate resin alone.

The foregoing detailed description has been given for clearness of understanding only and no unnecessary limitations are to be understood therefrom. The invention is not limited to the exact details shown and described, for obvious modifications will occur to those skilled in the art.

What is claimed is:

1. Thermoplastic compositions comprised of, in physical admixture:
    (i) from about 1 to about 85 weight percent of at least one randomly branched aromatic polycarbonate resin derived from (a) at least one dihydric phenol, (b) a carbonate precursor, and (c) a minor amount of at least one branching agent selected from polyfunctional organic compounds containing at least three functional groups; and
    (ii) from about 15 to about 99 weight percent of at least one copolyester-carbonate resin.

2. The compositions of claim 1 which exhibit improved processability and good heat distortion temperatures containing an amount of said branched aromatic polycarbonate resin effective to improve the processability of said compositions but insufficient to significantly deleteriously affect the heat distortion temperatures thereof.

3. The compositions of claim 2 wherein said amount of branched polycarbonate resin is from about 1 to about 15 weight percent.

4. The compositions of claim 3 wherein said amount of said branched polycarbonate resin is in the range of from about 2 to about 10 weight percent.

5. The compositions of claim 4 wherein said copolyester-carbonate resin is derived from bisphenol-A, a carbonate precursor, and a reactive derivative of an aromatic difunctional carboxylic acid.

6. The compositions of claim 5 wherein said carbonate precursor is phosgene.

7. The compositions of claim 6 wherein said reactive derivative of an aromatic difunctional carboxylic acid is selected from isophthaloyl dichloride, terephthaloyl dichloride, and mixtures thereof.

8. The compositions of claim 7 wherein said randomly branched aromatic polycarbonate is derived from bisphenol-A, phosgene, and a minor amount of at least one branching agent.

9. The compositions of claim 1 exhibiting improved hydrolytic stability containing an amount of said randomly branched aromatic polycarbonate effective to improve the hydrolytic stability of said compositions.

10. The compositions of claim 9 wherein said amount of branched aromatic polycarbonate is from about 15 to about 85 weight percent.

11. The compositions of claim 10 wherein said amount of said branched aromatic polycarbonate is from about 20 to about 85 weight percent.

12. The compositions of claim 11 wherein said copolyester-carbonate resin is derived from bisphenol-A, a carbonate precursor, and a reactive derivative of an aromatic difunctional carboxylic acid.

13. The compositions of claim 12 wherein said carbonate precursor is phosgene.

14. The compositions of claim 13 wherein said reactive derivative of said aromatic difunctional carboxylic acid is selected from isophthaloyl dichloride, terephthaloyl dichloride, and mixtures thereof.

15. The compositions of claim 14 wherein said branched polycarbonate is derived from bisphenol-A, phosgene, and a minor amount of at least one branching agent.

16. The compositions of claim 1 wherein said copolyester-carbonate resin is derived from bisphenol-A, a carbonate precursor, and a reactive derivative of a difunctional aromatic carboxylic acid.

17. The compositions of claim 16 wherein said carbonate precursor is phosgene.

18. The compositions of claim 17 wherein said reactive derivative of said aromatic difunctional carboxylic acid is selected from isophthaloyl dichloride, terephthaloyl dichloride, and mixtures thereof.

19. The compositions of claim 18 wherein said branched aromatic polycarbonate resin is derived from bisphenol-A and a carbonate precursor.

20. The compositions of claim 19 wherein said carbonate precursor is phosgene.

21. The compositions of claim 10 which contain an amount of branched polycarbonate resin effective to improve the thick section impact of said compositions.

22. The compositions of claim 21 wherein said amount is from about 20 to about 50 weight percent, based on the amount of said branched polycarbonate resin and said copolyester-carbonate resin present in the compositions.

23. The compositions of claim 22 wherein said copolyester-carbonate resin is derived from bisphenol-A, a carbonate precursor, and at least one difunctional carboxylic acid or a reactive derivative thereof.

24. The compositions of claim 23 wherein said carbonate precursor is phosgene.

25. The compositions of claim 24 wherein said reactive derivative of said difunctional carboxylic acid is selected from isophthaloyl dichloride, terephthaloyl dichloride, and mixtures thereof.

26. The compositions of claim 24 wherein said branched polycarbonate is derived from bisphenol-A, phosgene, and a minor amount of at least one branching agent.

27. The compositions of claim 25 wherein the said reactive derivative of said difunctional carboxylic acid is selected from terephthaloyl dichloride and mixtures of terephthaloyl and isophthaloyl dichloride.

* * * * *